Pravin G. Bhuta
Robert L. Johnson
Douglas J. Graham
INVENTORS

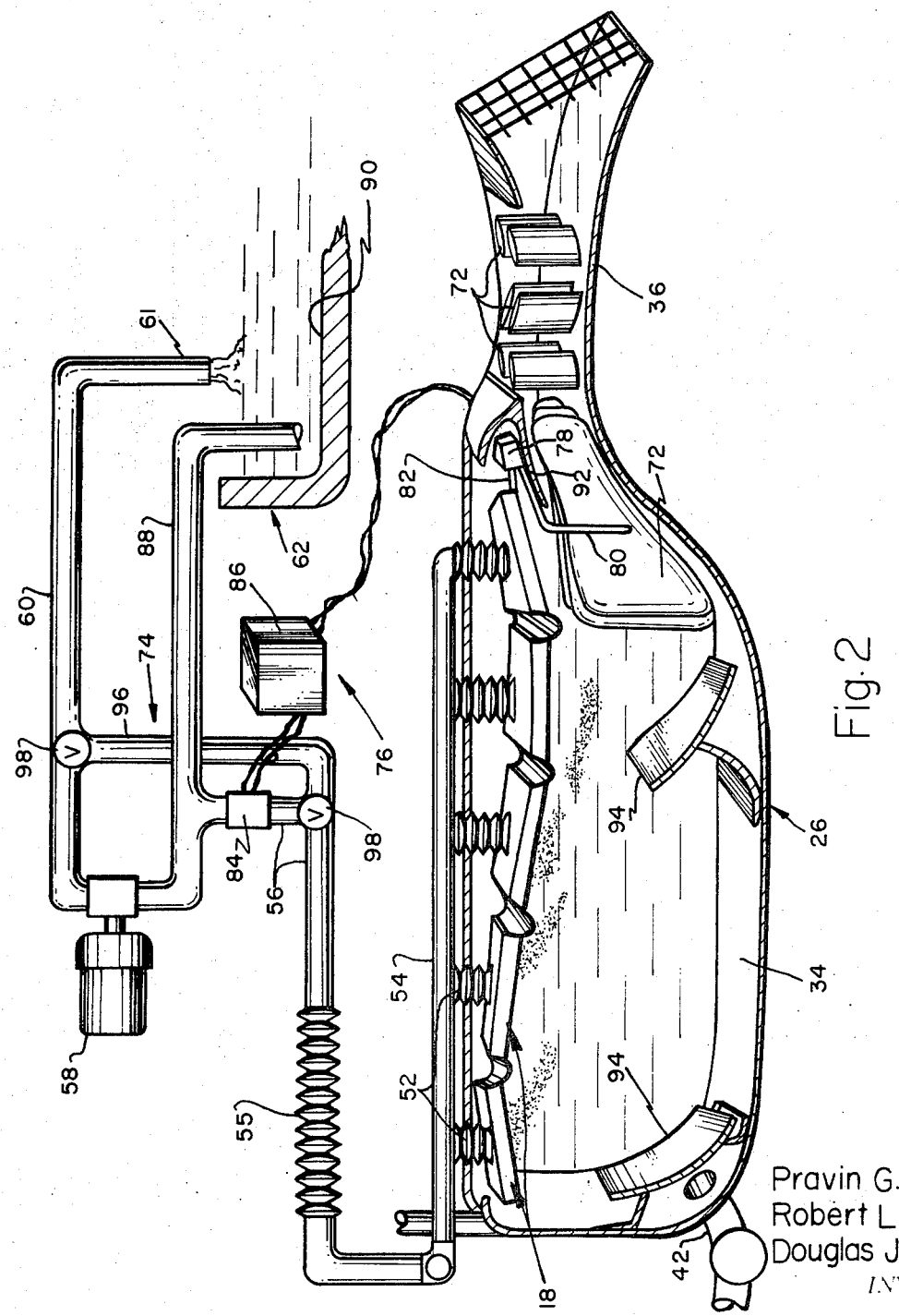

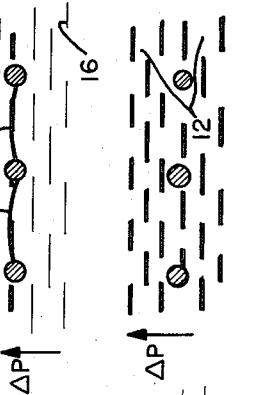
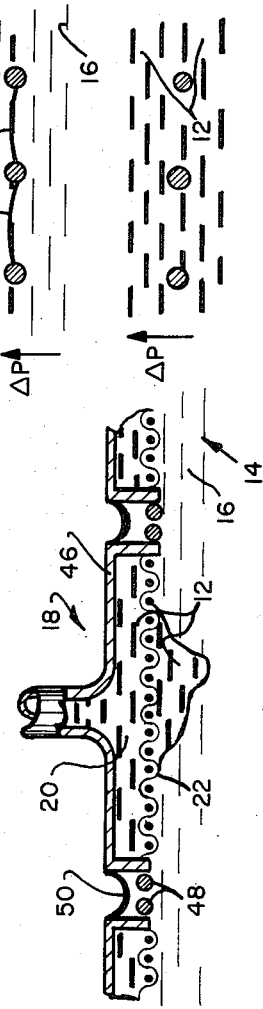
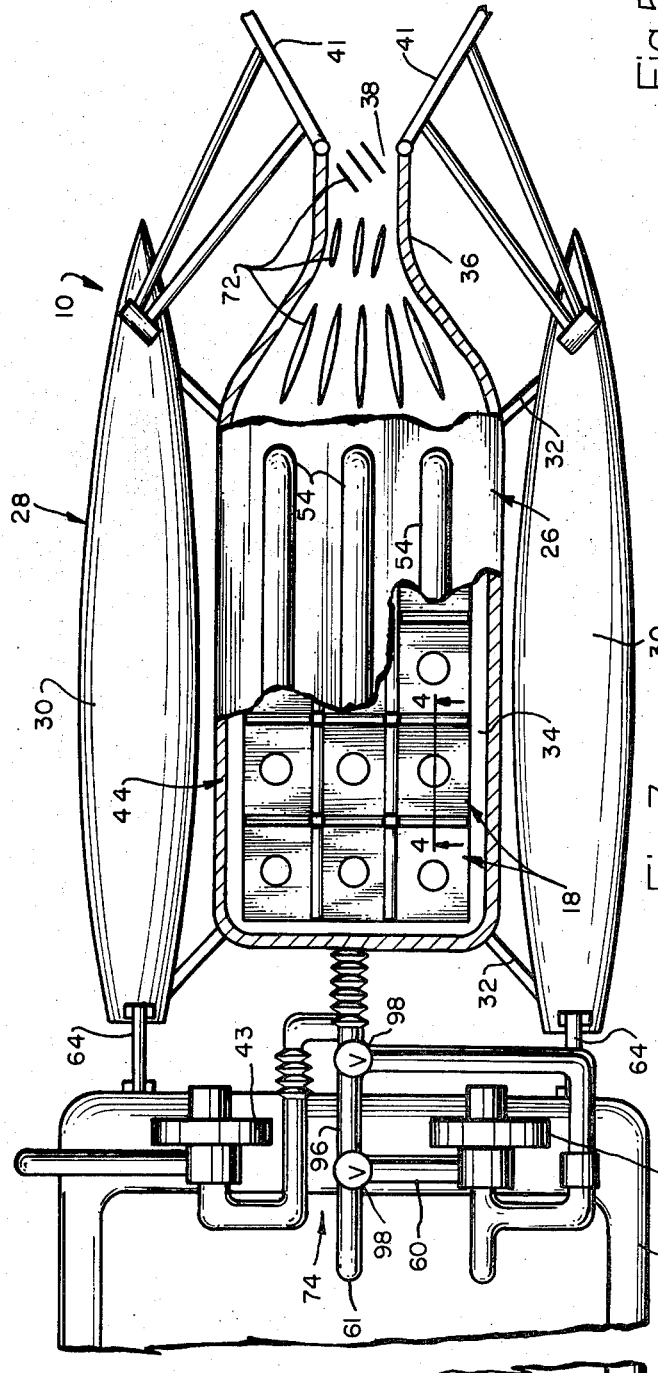
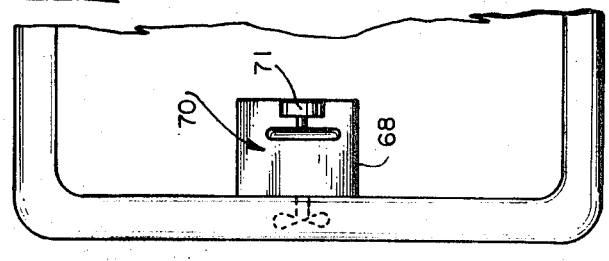
Pravin G. Bhuta
Robert L. Johnson
Douglas J. Graham
INVENTORS Nov. 21, 1972  P. G. BHUTA ET AL  3,703,463
SURFACE TENSION METHOD OF AND APPARATUS
FOR SEPARATING IMMISCIBLE LIQUIDS
Filed June 29, 1970  5 Sheets-Sheet 4

Pravin G. Bhuta
Douglas J. Graham
Robert L. Johnson
INVENTORS

BY
ATTORNEY

Pravin G. Bhuta
Douglas J. Graham
Robert L. Johnson
INVENTORS

United States Patent Office 3,703,463
Patented Nov. 21, 1972

3,703,463
SURFACE TENSION METHOD OF AND APPARATUS FOR SEPARATING IMMISCIBLE LIQUIDS
Pravin G. Bhuta, Torrance, Robert L. Johnson, Marina Del Rey, and Douglas J. Graham, Redondo Beach, Calif., assignors to TRW Inc., Redondo Beach, Calif.
Filed June 29, 1970, Ser. No. 50,640
Int. Cl. E02b 15/04
U.S. Cl. 210—23
22 Claims

ABSTRACT OF THE DISCLOSURE

A method of an apparatus for separating a selected liquid from a second liquid in which the selected liquid is immiscible by a surface tension action utilizing a hollow liquid surface tension separator having a surface tension screen wall is described. The separator is filled with the selected liquid and the outer side of its surface tension screen is placed in contact with the body of immiscible liquids to be separated, such that each screen pore exposed to the second liquid of the body contains a liquid-liquid interface whose interfacial surface tension resists passage of the second liquid through the pore. A pressure differential, less than the critical pressure differential necessary to overcome the interfacial surface tension force acting across the pore, is established across the screen to drive the selected liquid only through the screen into the separator. The primary application of the invention involves the removal or recovery of oil from a water surface utilizing an oil recovery apparatus which floats on and in some cases is propelled along the water surface and is equipped with one or more surface tension liquid separators for extracting the oil from the water surface.

BACKGROUND OF THE INVENTION

Field of the invention

This invention relates generally to the art of separating immiscible liquids and more particularly to a method of and apparatus for separating immiscible liquids using a surface tension screen to selectively extract one of the liquids. The invention relates also to a surface tension oil recovery method and apparatus for removing or recovery oil from a water surface.

Prior art

As will appear from the ensuing description, the surface tension liquid separation method and apparatus of the invention may be utilized to separate virtually any two immiscible liquids. The primary application of the invention, however, involves the removal or recovery of oil from the surface of water. For this reason, the invention will be disclosed in connection with such use.

Oil pollution of oceans, lakes, and rivers has become a serious problem in many parts of the world. The major sources of such oil pollution are leakage from offshore oil wells, wrecked oil tankers, and leakage and normal discharge from ships, harbor oil handling facilities, and the like. Such oil pollution not only causes costly damage to and destroys both the beauty and utility of shore lines, boats, marine facilities, and the like, but also impairs the health of and quite often kills marine life and water fowl.

A variety of techniques and devices have been proposed for removing such surface oil and, in some cases, recovering the oil for reuse. Up to the present time, however, none of these techniques and devices have been placed into widespread use owning to their impracticality, at least for large scale use, their cost, their incapability of operation in any but extremely calm water, and/or other deficiencies. Accordingly, a definite need exists for an improved oil removal and recovery method and apparatus which are not subject to the drawbacks of the existing techniques and devices. In its more limited aspects, the present invention provides such an improved oil recovery method and apparatus. In its broader aspects, the invention provides a liquid separation method and apparatus which may be utilized for separating virtuallly any two immiscible liquids.

SUMMARY OF THE INVENTION

According to its broader aspects, the invention provides a liquid separation method and apparatus for separating, with a surface tension liquid screening aciton, a selected liquid from a second liquid in which the selected liquid is immiscible. This surface tension screening action involves the use of a surface tension liquid separator containing a chamber bounded at least in part by a surface tension screen wall which is preferably preferentially wetted by the selected liquid. In operation of the liquid separation apparatus, the liquid separator chamber is filled with the selected liquid, such that the latter wets the screen. The outer side of the screen is placed in contact with the body of immiscible liquids. Under these conditions, each screen pore which is directly exposed to the second liquid in the liquid body contains a liquid-liquid interface whose interfacial surface tension resists passage of the latter liquid through the pore. On the other hand, each screen pore which is exposed directly to the selected liquid in the liquid body is devoid of such a liquid interface. Accordingly, passage of the selected liquid through the pore is not resisted by interfacial surface tension force.

While the surface tension screen is thus in contact with the liquid body, a regulated pressure differential is established across the screen, in a direction tending to drive liquid through the screen into the separator chamber. This pressure differential is continuously monitored and regulated by an automatic pressure regulating system which maintains the pressure differential at a level below the critical pressure differential required to drive the second liquid through the screen against the resistance of interfacial surface tension. Accordingly, any selected liquid in contact with the outer side of the screen is driven through the screen into the separator chamber. On the other hand, passage of the second liquid through the screen into the separator is blocked by interfacial surface tension.

A more limited but highly important aspect of the invention is concerned with an oil recovery method and apparatus for removing and recovering oil from the surface of water. In this application, a surface tension oil-water separator is filled with oil and supported by means of a float, such that the separator floats at the water surface. The oil is pumped from the separator chamber into a collection chamber, as the screen pressure regulating system permits, thereby maintaining a pressure differential less than the critical pressure differential required to force water through the separator screened into the separator chamber. Accordingly, any oil which contacts the outside (waterside) of the screen is drawn through the latter into the separator chamber from which the oil is pumped to the collection chamber.

The preferred forms of the oil recovery apparatus embody a stilling basin with a surface skimmer inlet through which surface water and oil enter the basin and an outlet through which water is discharged from the basin. Contained within the stilling basin are one or more surface tension oil-water separators for extracting oil from the water-oil mixture which enters the basin. Certain embodiments of the oil recovery apparatus are designed for sweeping large areas of a water surface. These embodiments comprise essentially a floating oil recovery vessel equipped with a large stilling basin having a forwardly opening surface skimmer inlet and with propulsion means for propelling the oil recovery vessel forwardly through the water in such a way as to cause entrance of surface water and oil into the stilling basin through its skimmer inlet. Within the stilling basin are a number of surface tension oil-water separators for extracting oil from the water in the basin. This oil is pumped from the separators into an oil receiver or collection chamber, such as a trailing barge. One disclosed oil recovery vessel utilizes an array of flat rectangular oil-water separators arranged edge-to-edge in rows extending lengthwise and crosswise of the stilling basin. The separators float on the water surface and are connected by flexible couplings in such a way that the separators may rise, fall, and rotate relative to one another under the action of wave motion within the stilling basin. Another disclosed oil recovery vessel utilizes rotary oil-water separator drums. These drums have an outer surface tension screen wall defining radial vanes about the drums. During oil recovery operation, the separator drums are driven in rotation in such a way that the entire surface area of each drum is brought into contact with oil in the stilling basin and oil collects between the drum vanes to increase the residence time of contact of the oil with the drums.

Other disclosed embodiments of the present oil recovery apparatus are designed to remain stationary on the water surface or to be propelled by hand about the surface with the aid of a pole, or the like, to permit surface oil removal from confined spaces, such as under piers and the like. These latter embodiments are equipped with pumping means for inducing flow of surface water and oil through the apparatus.

An important feature of the invention which may be utilized to advantage in oil recovery operations in cold areas involves heating the oil adjacent to the surface tension screen to reduce its viscosity and thereby accelerate passage of the oil through the screen.

BRIEF DESCRIPTION OF THE DRAWINGS

In the drawings:

FIG. 2 is a semi-diagrammatic section through the oil recovery vessel of FIG. 1;

FIG. 3 is a plane view of the oil recovery vessel;

FIG. 4 is an enlarged section taken on line 4—4 in FIG. 3;

FIG. 5 is an enlarged section through screen pores which are externally exposed to water;

FIG. 6 is an enlarged section through screen pores which are externally exposed to oil;

DESCRIPTION OF THE PREFERRED EMBODIMENTS

Figure 1:
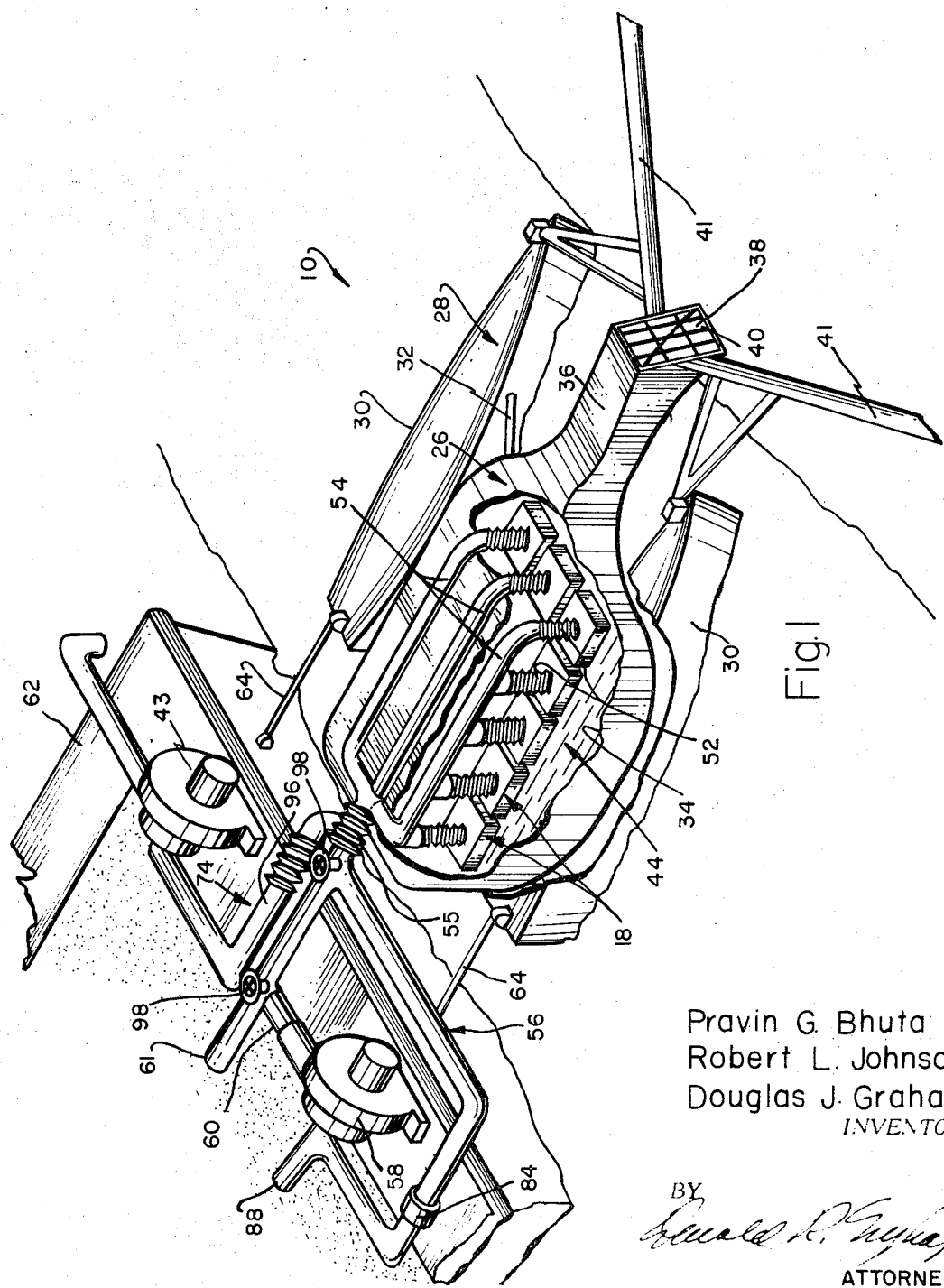
FIG. 1 is a perspective view of a surface oil recovery vessel according to the invention with parts broken away for the sake of clarity.

FIGS. 1 through 6 illustrate a surface tension liquid separation apparatus 10 according to the invention for separating a selected liquid 12 from a liquid body 14 containing a second liquid 16 which is immiscible. In this instance, the selected liquid 12 is oil, the second liquid 16 is water on the surface of which the oil floats, and the liquid body 14 is a lake, ocean, river, or the like. The illustrated apparatus is thus a surface oil recovery apparatus for removing or recovering oil from the surface of water.

The main oil-water separation means of the oil recovery apparatus 10 is comprised of surface tension oil-water separators 18. Turning to FIG. 4, it will be observed that each separator 18 contains a chamber 20 bounded at one side, in this instance at its lower side, by a wall 22 comprising a surface tension screen. When the separator 18 is conditioned for operation, its chamber 20 is filled with the selected liquid to be recovered, i.e. oil, such that the oil wets the screen. According to preferred practice of the invention, screen 22 is constructed as a material which is preferentially wetted by the selected liquid to be recovered. In this regard, it is significant to note that the liquid which is selected for recovery by filling the separator chamber is preferably the one which preferentially wets the separator screen.

In the operation of the surface tension liquid separator 18, the outer side of its screen 22 is placed in contact with the body of water, as shown in FIG. 4. Under these conditions, each screen pore exposed externally to water contains a liquid or oil-water interface 24 (FIG. 5) which separates the oil on the inside of the screen from the water on the outside of the screen. Each interface possesses an interfacial surface tension which resists passage of the water through the pore into the separator chamber 20. This interfacial surface tension blocks passage of the water through the pore under the action of a differential pressure $\Delta P$ (water pressure greater than oil pressure in the separator chamber 20) across the screen which is less than the critical pressure differential required to overcome the interfacial surface tension, i.e. required to drive the water through the pore against the interfacial surface tension of the corresponding oil-water interface 24. This critical pressure differential is determined by the interfacial surface tension of the oil and water and by the characteristics, i.e. pore size, material, etc., of the surface tension screen 22. The critical pressure differential $\Delta P_c$ is represented by the equation:

$$\Delta P_c = p_w - p_o = K \frac{\sigma_{wo}}{r}$$

where $p_w$ is the total water pressure outside of the screen,
$p_o$ is the oil pressure just inside the screen,
$\sigma_{wo}$ is the interfacial surface tension between water and oil,
$r$ is the radius of the oil-water interface (i.e., the radius of the screen pores, and
K is a constant of proportionality having a value of approximately 2.0, depending on the type of screen.

In contract, the screen pores which are exposed to oil on the outside of the surface tension screen 22 contain no liquid interface, as may be readily observed in FIG. 6. Accordingly, passage of the oil through the screen into the separator chamber 20 is not resisted by interfacial surface tension. The pressure differential maintained across the screen by pressure regulating system thus drives the oil through the screen into the separator chamber 20.

From the foregoing discussion, it will be understood that if a pressure differential $\Delta P$ less than the critical pressure differential $\Delta P_c$ is established across the surface tension screen 22 of the oil-water separator 18, only oil in contact with the outer surface of the screen will pass through the screen into the separator chamber 20. Passage of water through the screen is blocked by the interfacial surface tension of the oil-water interfaces 24.

Returning now to the oil recovery apparatus 10, the latter comprises a floating oil recovery vessel having a relatively large stilling basin 26 supported by float means 28 such that the basin floats at the surface of the water from which the surface oil is to be recoverd. In this instance, the float means 28 comprise pontoons or catamaran hulls 30 which straddle the stilling basin and are attached to the basin by struts 32. Contained within the stilling basin 26 is a relatively large stilling chamber 34. The forward end of the basin is necked down to form an inlet diffuser throat 36. The diffuser passage within the throat opens rearwardly to the stilling chamber 34 and forwardly to a surface skimmer inlet 38. This inlet projects a distance above and below the normal water line level of the stilling basin. A grill 40 is placed across the inlet to block the entrance of sizable floating objects. A pair of surface skimming booms 41 extend forwardly from the inlet in diverging relation to one another. At the rear end of the stilling basin is an outlet 42 connected to the inlet of a pump 43.

Within the stilling chamber 34 is an array 44 of oil-water separators 18. Each separator has a relatively flat rectangular housing 46 (FIG. 4) with an open bottom side across which extends the separator surface tension screen 22. Encircling each housing is a ring float 48 which provides the separator with positive bouyancy in water. The several separators 18 are arranged side-by-side in rows extending lengthwise and crosswise of the stilling basin to form a rectangular separator array which encompasses virtually the entire water surface area in the stilling chamber. The adjacent separators are joined by hinge means 50, in this instance fabric or plastic webs, which permit the separators to rise, fall, and rotate relative to one another under the action of wave motion in the stilling chamber.

Connected to the center of the upper wall of each separator housing 46 is an axially and laterally flexible riser 52. The risers of the several separators in each axial separator row connect to a header 54. The rear ends of the headers connect to a common flexible outlet conduit 55, connected to suction line 56 of a pump 58. The discharge line 60 of pump 58 connects to a spout 61 which empties into an oil receiver 62. In this instance, the oil receiver is a large barge which is attached, by hinged vertically swingable links 64 to the rear end of the hulls 30. Pump 58, as well as the earlier mentioned stilling basin suction pump 43, are mounted on the front of the barge. The discharge of the basin suction pump empties overboard.

During operation of the oil recoverd apparatus or vessel 10, the latter is propelled forwardly through the water by suitable propulsion means. The particular oil recovery vessel illustrated has a propulsion engine 68 at the rear of the barge 62. Located over the engine is an operator station 70 equipped with means 71 for steering control, controlling the engine 68, and the pumps 43, 58.

As the oil recovery vessel 10 moves forwardly through the water, the skimmer booms 41 skim the water surface and convey any oil on the surface toward and finally into the skimmer inlet 38. The surface water and oil entering the inlet pass through the inlet diffuser throat 36 into the stilling chamber 34. The inlet throat passage flares outwardly as it enters the chamber to diffuse the entering, relatively high velocity water-oil stream to a relatively low velocity stream within the stilling chamber. Flow control and diffuser vanes 72 are mounted in the passage to aid this diffusing action and to damp wave motion. Water exits from the chamber through the chamber outlet 42 and the pump 43 which discharges the water overboard.

The oil-water separators 18 extract oil from the water within the stilling chamber 34. In this regard, it will be understood that the separators are initially filled with oil to condition them for their earlier described surface tension oil-water separating or screening action. The separa- explained presently. Actual oil extraction operation of the tors are thus filled with oil through a filling system 74 to be explained presently. Actual oil extraction operation of the separators is initiated by operating the pump 58 to reduce the pressure within the separator chambers 20 and thereby produce across the separator screens 22 the pressure differential required to induce oil passage through the screen into the separator by the surface tension oil-water separating screening action described earlier.

As noted in this earlier description, in order to induce passage of oil only, and not water, into the separators, the pressure differential across the separator screens 22 must be maintained less than the critical pressure differential $\Delta P_c$. To this end, the oil recovery vessel 10 is equipped with an automatic pressure control system 76 for continuously monitoring the pressure differential across the separator screens and regulating the separator pumping action to maintain the proper pressure differential across the screens. The particular control system illustrated comprises a differential pressure transducer 78 mounted within the stilling chamber 34. This transducer is exposed, through a tube 80, to the water pressure on the outside of the separator screens, and through a flexible tube 82, to the oil pressure on the inside of the screen of an adjacent separator 18. The lower open end of pipe 80 is submerged to a depth sufficient to avoid uncovering of this end by wave motion. Electrically connected between the transducer 78 and a solenoid proportioning valve 84 in the pump suction line 56 is a valve control unit 86. Leading from the suction line 56, at a point between the valve 84 and pump 58, is an intake line 88 which opens to the bottom of the oil collection chamber 90 in the barge 62.

The transducer 78 senses the water pressure on the outside of the separator screens 22 and the oil pressure on the inside of the screen of the adjacent separator and generates an electrical signal representing the difference between these pressures. The control unit 86 operates the proportioning valve 84 in response to this electrical signal to proportion flow through the lines 56, 88 in such a way as to maintain the screen pressure differential at the proper level to accomplish the oil-water separating action. Thus, the control unit 86 responds to a progressively increasing pressure differential across the screens 22 by progressively closing the proportioning valve 84. Under these conditions, oil flow from the separators 18 is progressively reduced and the oil flow through that part of the oil recirculating loop comprising collection chamber 90, and that part of the intake line 88 before the point where line 56 joins 88, is correspondingly increased. The internal pressure in the separators 18 is thereby reduced. Conversely, the control unit 88 responds to a progressively diminishing pressure differential across the separator screens 22 by progressively opening the proportioning valve 84 to increase the oil flow from the separators and reduce the circulating oil flow through that part of the oil circulating loop comprised of 90 and that part of 88 before the point where line 56 joins 88. The internal pressure in the separators is thereby increased. The control system 76 is adjusted to maintain the selected pressure differential across the separator screens 22. In this regard, it is significant to note that the control system maintains the proper pressure differential regardless of the presence or absence of oil in contact with the outer surface of the separator screens.

From the description to this point, it will be understood that the oil recovery apparatus or vessel 10 is effective to extract from the water in the stilling chamber 34 any oil which enters into contact with the separator screens 22 and to collect the oil in the barge collection chamber 90. The only remaining requirement for efficient operation of the oil recovery vessel 10, therefore, involves contacting the incoming oil with the separator screens. This is accomplished by an inlet deflector 92 and bottom deflectors 94 within the stilling chamber 34. The inlet deflector 92 deflects the entering water and oil downwardly to the bottom of the chamber, such that the oil then rises into contact with the underside of the separator screens. This upward motion of the oil into contact with the screens is aided by the bottom deflectors 94 and by the diffusing action of the diffuser inlet throat 36 and vanes 72 which slow the entering oil-water stream to increase the residence time of the oil in the chamber.

As noted earlier, water exits from the stilling chamber through the outlet 42 and the pump 43 which discharge the water overboard.

As noted earlier, the oil recovery vessel 10 has means 74 for initially filling the separators 18 with oil, thus to condition the same for their oil-water separating action. The particular filling means shown comprises a fill line 96 connecting the suction and discharge lines 56, 60 of the pump 58, and two-way valves 98 which may be set in normal operating position and separator filling position. In their normal operating position, these valves block the ends of the fill line 96 and connect the pump intake to both the separators 18 and the intake line 88 and the pump outlet to the spout 61. The apparatus is then conditioned for the described oil recovery operation. In filling position, valves 98 connect the pump intake to the intake line 88 only and the pump outlet to the separators 18, only, through the fill line 96. Under these conditions, operation of the pump 58 draws oil from the barge 62 through the intake line 88 and delivers the oil to the separator 18 through the discharge line 60, fill line 96, and separator headers 54.

Figures 7, 8:
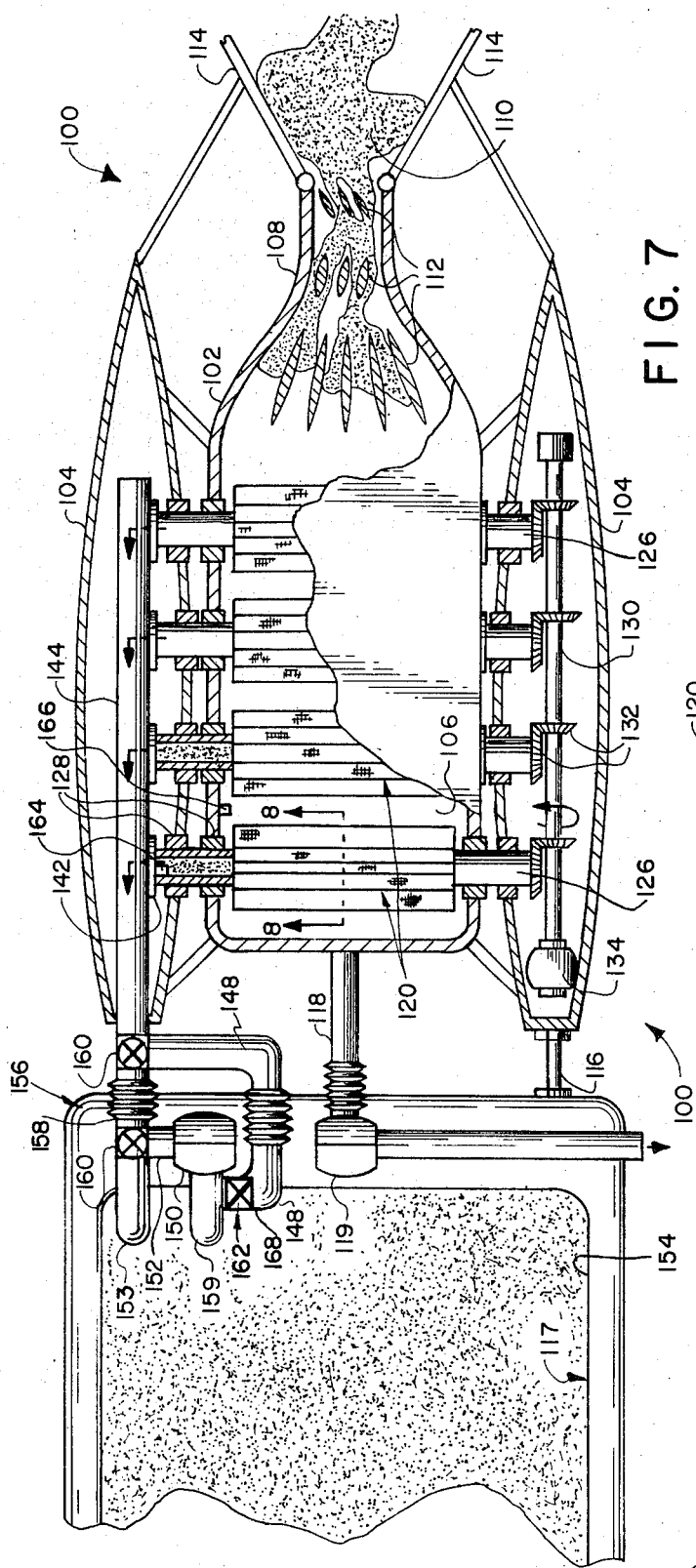
FIG. 7 is a plane view of a modified oil recovery vessel according to the invention.
FIG. 8 is an enlarged section taken on line 8—8 in FIG. 7.

The modified surface oil recovery apparatus or vessel 100 of FIGS. 7 and 8 has a stilling basin 102 supported by straddling pontoon floats or catamaran hulls 104. The stilling basin 102 contains a stilling chamber 106 which opens forwardly through an inlet diffuser throat 108 terminating in a surface skimmer inlet 110. Within the throat passage are flow control and diffuser vanes 112. Surface skimmer booms 114 extend forwardly in diverging relation from the inlet. Attached to the rear ends of the hulls 104, by hinged vertically swingable links 116, is an oil collection barge 117. At the rear end of the stilling basin 102 is an outlet 118 connected to a suction pump 119 on the barge. The oil recovery vessel described to this point is thus generally similar to that of FIGS. 1 through 6.

The modified oil recovery vessel 100 differs from that of FIGS. 1 through 6 in the type of oil-water separators which are employed to extract oil from the water in the stilling chamber 106. In the modified apparatus, the oil-water separators 120 comprise rotary drums each having an outer surface tension screen wall 122. This screen wall or screen is shaped to form a number of hollow radial vanes 124 circumferentially spaced about the drum. Extending centrally through each drum is a tubular shaft 126. The ends of this shaft extend beyond the ends of the drum 120 and through the sidewalls of the stilling basin 102 and the inner sidewalls of the hulls 104. The shaft ends are rotatably supported in bearings 128 in the basin and hull walls and are sealed to the hull walls in any convenient manner. Each separator drum 120 has endwalls which are fixed to the respective shaft 126, such that the shaft and drum rotate in unison. The several separator drums are arranged side-by-side in the fore and aft direction of the stilling chamber 106 so as to occupy virtually the entire water surface area in the chamber. The drums have their axes located in a common horizontal plane approximately at the normal water line level in the chamber.

Rotatably supported in and extending longitudinally through the lower hull 104 in FIG. 7 is a drive shaft 130. This drive shaft is drivably coupled by bevel gears 132 to the adjacent end of the separator drum shafts 126. Shaft 130 is driven in rotation by a motor 134 to rotate the separator drums 120 in the clockwise direction in FIG. 8. The rotational speed of the drums is relatively low, and may be on the order of 3 r.p.m.

Extending centrally through each drum shaft 126 is a passage 136. This passage communicates to the interior of the respective separator drum chamber 138 through ports 140 in the shaft. The lower ends of the drum shaft 126 in FIG. 7 are sealed. The upper ends of the shafts in FIG. 7 are connected by rotary seals 142 to a header 144 extending longitudinally through the adjacent hull 104. The drum shaft passages 136 open to the interior passage in this header. The front end of the header 144 is sealed. The rear end of the header extends rearward of the hull 104 and is connected to the suction line 148 of a pump 150 mounted on the barge 117. Pump 150 has a discharge line 152 connecting to a spout 153 which empties into the coil collection chamber 154 in the barge. The barge has a rear engine and control station (not shown) like the barge in FIGS. 1 through 6.

The oil recovery vessel 100 has filling means 156 for initially filling the separator drums 120 with oil. This filling means is essentially identical to that of the oil recovery vessel 10 and thus need not be explained in detail. Suffice it to say that the filling means 156 includes a fill line 158 connecting the pump suction and discharge lines 148, 152, a pump intake 159 opening to the bottom of the oil collection chamber 154, and two-way valves 160 for placing the pumping system in the normal operating and separator filling modes described earlier.

During operation of the oil recovery vessel 100, the barge engine is operated to propel the vessel through the water and thereby induce flow of surface water and oil through the skimmer inlet 110 into the stilling chamber 106. The pump 119 is operated to discharge water overboard from the rear end of the stilling chamber. Pump 150 is operated, with valves 160 set in normal operating position, to pump oil from the separator drums 120 and thereby establish across the drum screens 122 the pressure differential required to effect the earlier described surface tension oil-water separating action. It will now be understood, therefore, that the oil-water recovery vessel 100 is effective to extract from the water within stilling chamber 106 any oil which enters into contact with the drum screens. The oil is pumped from the interior chambers 138 of the separator drums 120 through the drum shaft ports 140, shaft passages 136, and header 144 to the barge 117.

A feature of the oil recovery vessel 100 resides in the fact that the separator drums 120 are driven in a clockwise direction of rotation in FIG. 8 by their drive motor 134 during the oil recovery operation. This drum rotation achieves two benefits. First, drum rotation exposes the entire surface area of each drum screen 122 to the water and oil in stilling chamber 106. The surface area of each drum screen, in turn, is maximized by the vaned configuration of the screen. Thus, the total effective surface tension screen area of the oil recovery vessel is maximized, thereby maximizing the oil recovery rate for a given stilling chamber area. Secondly, the rotating screen vanes 122 displace oil from the surface of the water in the stilling basin to the under sides of the screens, where the oil rises upwardly along the vanes and is trapped in that area between the vanes thereby retaining the oil in contact with the screen. The vanes carry the oil around with the drum to increase the residence time of the oil in contact with the screen drums.

Oil recovery apparatus 100 has a pressure control system 162 for maintaining the proper pressure differential across the separator drum screens 122. This control system is essentially identical to that of the earlier oil recovery vessel 10 and need not be explained in detail. Suffice it to say that the control system 156 comprises a pair of pressure transducers 164, 166, a flow proportioning valve 168 in the pump suction line 148, the pump intake 159, and a control unit (not shown) for operating the valve 168 in response to the pressure signals from the transducers to maintain the internal screen pressure at the level to establish the proper pressure differential across the drum screens. Transducers 164 is mounted within and attached to the stationary member of the rear drum rotary seal 142 to sense the pressure of the oil exiting from the rear separator drum 120. This oil pressure, of course, is slightly less than the oil pressure on the inner surface of the rear drum screen 122. Transducer 164 is calibrated and adjusted to compensate for this pressure drop in the oil from the screen to the transducer in a manner such that the transducer provides a pressure signal representing the internal screen pressure of the rear drum. Transducer 166 is mounted within the stilling chamber 106, below the normal water line level in the chamber, so as to provide a pressure signal representing the external water pressure on the rear drum screen 122.

Figure 9:
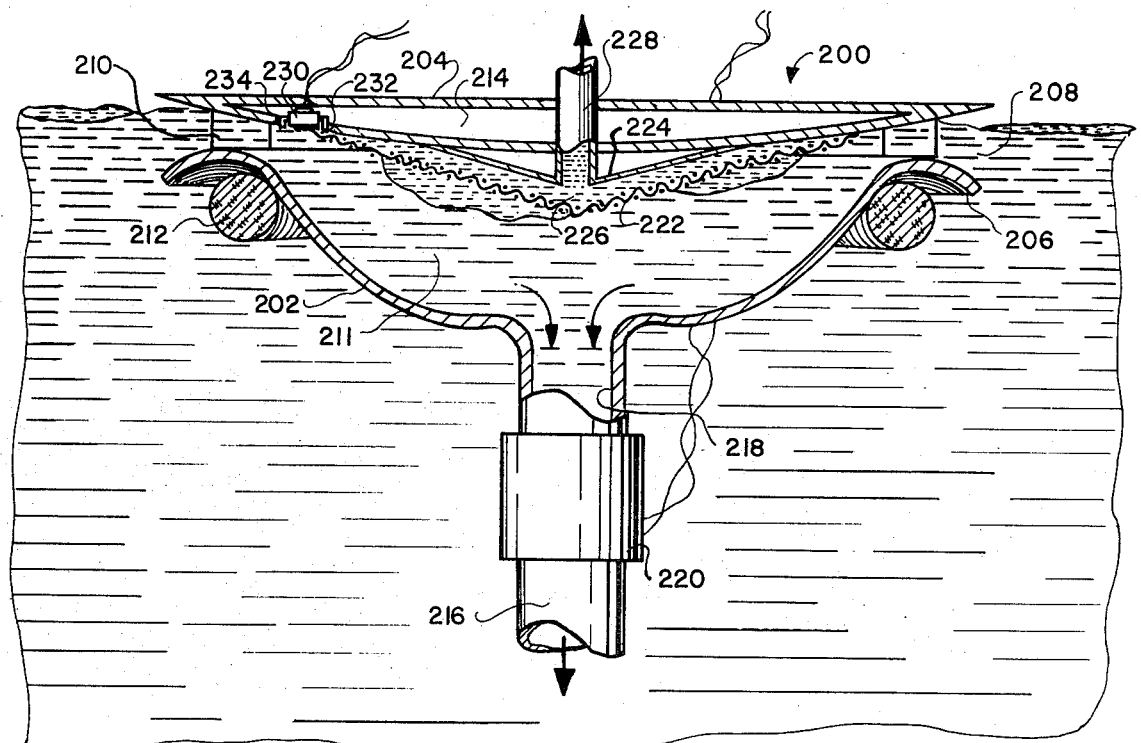
FIG. 9 is a vertical section through a modified oil recovery apparatus according to the invention.

FIG. 9 illustrates an oil-water separator or surface oil recovery apparatus 200 according to the invention which may be tethered to float stationary in the water or may be attached to a pole, or the like, to permit movement of the apparatus by hand through confined areas under piers and the like. Oil recovery apparatus 200 has a lower bowl 202 and a hollow top plate 204 which together form a stilling basin. The perimeter of bowl 202 is curle outwardly and downwardly to form a rim 206. The top plate 204 overlies the basin rim 206 to define an intervening annular surface skimmer inlet 208. Plate 204 is attached to the basin rim 206 by struts 210 which may serve as diffuser vanes. Bowl 202 and top plate 204 define an intervening stilling chamber 211 communicating with the skimmer inlet 208. Surrounding the bowl 202, below its rim 206, is a ring float 212. This float and the void 214 wilthin the top plate 204 provide the oil recovery apparatus with a positive buoyancy in water, such that the apparatus floats with the skimmer inlet 208 at water surface level.

Extending from the bottom of the bowl 202 is a tube 216 which is open at its lower end and provides an outlet passage 218 from stilling chamber 211. Mounted along this outlet tube is a motor driven pump 220 having a rotary driven impeller or the like (not shown) within the outlet passage 218 for pumping water from stilling chamber through the passage. This pumping action draws surface water and oil into the chamber through the skimmer inlet 208.

Sealed about its perimeter to the underside of the top wall 204 is a surface tension screen 222. Fixed to the underside of the wall within the screen is a conicol wall member 224 which defines with the screen a narrow intervening separator chamber 226. An oil outlet tube 228 extends upwardly from the center of the wall member 224 and through the top plate 204. This oil outlet tube connects to a pumping system (not shown) similar to those described earlier for pumping oil from and thereby reducing the pressure in the separator chamber 226 to produce a pressure differential across the screen 222. As in the previous forms of the invention, the pumping system connected to the oil outlet tube 228 is controlled by an automatic pressure control system for maintaining across the screen the maximum pressure differential to achieve the earlier described oil-water separating action. This control system is like those described earlier and includes a differential pressure transducer 230 mounted on the underside of the top plate 204, adjacent the edge of the screen 222. The transducer is exposed to the internal screen pressure through a tube 232 opening to the separator chamber 226. The transducer is exposed to the external screen pressure through a tube 234 opening to the water on the outside of the screen. Transducer 230 generates an output signal representing the pressure differential across the screen. As described earlier, this pressure signal is fed to the control unit of the pressure control system which actuates the proportioning valve in the oil pumping system to maintain the correct pressure differential across the screen 222.

In operation of the oil recovery apparatus 200, water pump 220 is operated to induce flow of surface water and oil through the skimmer inlet 208 into the stilling chamber 211. The shape of the chamber in vertical cross-section will be seen to be such as to produce a diffusing action which slows the entering stream and thereby permits contact of the oil with the screen 222. The oil is drawn through the screen into the separator chamber 226 and is then pumped from this chamber through the outlet tube 228 to an oil receiver or collection chamber. The oil recovery apparatus 200 may be tethered in a stationary position or attached to a pole or the like to permit the apparatus to be moved about the water surface by hand and particularly through confined spaces, such as under piers and the like.

Figure 11:
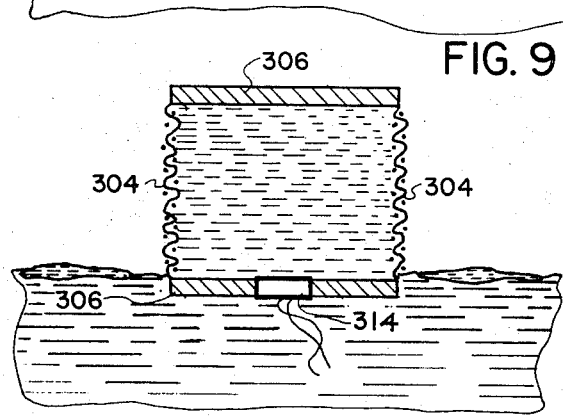
FIG. 11 is an enlarged section taken on lines 11—11 in FIG. 10.
Figure 10:
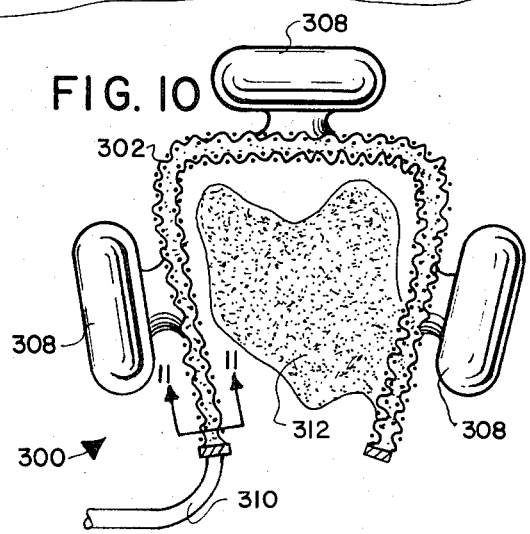
FIG. 10 is a horizontal section through a further modified oil recovery apparatus.

The surface oil recovery apparatus 300 of FIGS. 10 and 11 comprises a tubular surface tension oil-water separator 302 with surface tension screen sidewalls 304 and solid top and bottom walls 306. Attached at intervals to the separator are floats 308 which support the separator in water in the position of FIG. 11. In this position, the separator screens 304 contact the surface water and oil. One end of the separator 300 is closed. The other end of the separator is connected to the suction line 310 of a pumping system like those described earlier.

In use, the separator 300 is placed in a surrounding relation to an oil slick or patch 312 on the water's surface. The pumping system is then operated to effect the surface tension oil-water separating action described earlier, whereby the oil is drawn into the separator through the screens 304 and is pumped to an oil collection chamber.

The oil recovery apparatus 300 is provided with an automatic pressure control system like those described earlier for controlling the pumping system to maintain the proper pressure differential across the submerged portions of separator screens 304. This control system includes a differential pressure transducer 314 mounted in the bottom wall 306 of the separator for sensing internal and external screen pressures.

Figure 12:
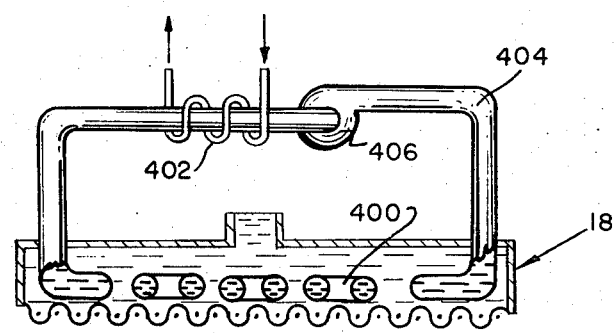
FIG. 12 is a section through a modified surface tension oil-water separator according to the invention.

The decrease in oil collection rate due to a reduction in oil temperature in arctic regions or when collecting oil of high viscosity in temperate regions can be compensated for by placing a heat exchanger inside the surface tension screen separator to heat the oil and reduce its viscosity. FIG. 12, for example, shows such a heat exchanger 400 within a present separator 18. Heat for the exchanger can be obtained from any convenient source. In the present oil recovery vessels, for instance, waste heat from the propulsion engine may be circulated through a heat exchanger 402 disposed in heat transfer relation to a conduit 404 containing a pump 406 for recirculating a heat transfer fluid, such as water, through the heat exchanger 400. The heat exchanger is arranged close to and preferably in direct contact with the surface tension screen so as to support the screen. The oil is heated by the heat exchanger 400 and, since the oil is in intimate contact with the screen, the screen is heated also. Any oil coming in contact with the outside of the screen adheres to the screen since it is wetted with a similar oil. Heat is thereby transferred to the oil on the outside of the screen thus reducing its viscosity and allowing the flow rate through the screen to be increased.

The parameters of the surface tension screens employed in the present oil recovery apparatus may vary, depending upon the oil to be recovered. For California crude oil, suitable screen parameters are as follows:

Screen material—stainless steel
Screen pore size—50 x 250 mesh
$\Delta P$ across screen—2" $H_2O$ (.07 p.s.i.)

What is claimed as new in support of Letters Patent is:
1. The method of separating a selected liquid from a second liquid immiscible with the selected liquid, comprising the steps of:
providing a hollow liquid separator containing a chamber filled with said selected liquid and bounded by a screen having at least a portion of its outer surface in contact with the body of the immiscible liquids to be separated, whereby those screen pores which are externally exposed to said second liquid contain a liquid interface whose beneficial surface tension resists passage of said second liquid through the respective pores into said chamber, and those pores which are externally exposed to said selected liquid are devoid of a liquid interface resisting passage of said selected liquid through the respective pores into said chamber; and after filling said chamber with said selected liquid inducing passage of said selected liquid only from said liquid body through said screen into said chamber by pumping the selected liquid from said chamber to establish a pressure differential across said screen, sensing said pressure differential, and regulating the flow rate of the selected liquid from said chamber in response to the pressure differential to maintain a pressure differential less than the critical pressure differential $$\Delta P_o = p_w - p_o = K \frac{\sigma_{wo}}{r}$$

required to overcome said interfacial surface tension and drive said second liquid through said screen into said chamber, where $p_w$ is the total liquid pressure outside of the screen, $p_o$ is the liquid pressure just inside the screen, $\sigma_{wo}$ is the interfacial surface tension between said liquids, $r$ is the radius of the liquid interface (i.e., the radius of the screen pores, and K is a constant of proportionality having a value depending on the type of screen.

2. The method of claim 1 wherein:
the density of said selected liquid is less than the density of said second liquid, whereby said selected liquid floats at the surface of said body of liquids; and said screen is located adjacent said body surface for contact by the floating selected liquid.

3. The method of removing oil from the surface of a body of water comprising the steps of:
providing a hollow oil-water separator containing a chamber filled with oil and bounded by a screen having at least a portion of its outer surface in contact with said body of water, whereby those screen pores which are externally exposed to said water contain an oil-water interface whose interfacial surface tension resists passage of water through the respective pores into said chamber, and those pores which are externally exposed to oil are devoid of an oil-water interface resisting passage of the oil through the respective pores into said chamber; and after filling said chamber with oil inducing passage of oil only from said body of water through said screen into said separator chamber by pumping the oil from said chamber to establish a pressure differential across said screen, sensing said pressure differential, and regulating the flow rate of the oil from said chamber in response to the pressure differential to maintain a pressure differential less than the critical pressure differential $$\Delta P_o = p_w - p_o = K \frac{\sigma_{wo}}{r}$$

required to overcome said interfacial surface tension and drive water through said screen into said separator chamber where $p_w$ is the total water pressure outside of the screen, $p_o$ is the oil pressure just inside the screen, $\sigma_{wo}$ is the interfacial surface tension between water and oil, $r$ is the radius of the oil-water interface (i.e., the radius of the screen pores), and K is a constant of proportionality having a value depending on the type of screen.

4. The method of removing oil from the surface of a body of water comprising the steps of:
selecting an oil recovery apparatus including a stilling basin having a stilling chamber containing an oil-water separator including a chamber filled with oil and bounded by a screen;
inducing flow of surface oil and water from said water body into said stilling chamber;
supporting said separator with at least a portion of the outer surface of its screen in contact with the water in said stilling chamber in a manner such that said screen is disposed for contact by oil entering said stilling chamber, whereby those screen pores which are externally exposed to water contain an oil-water interface whose interfacial surface tension resists passage of water through the respective pores into said separator chamber, and those screen pores which are externally exposed to oil are devoid of an oil-water interface resisting passage of the oil through the respective pores into said separator chamber;

after filling said separator chamber with oil, inducing passage of oil only from said still chamber through said screen into said separator chamber by pumping oil from said separator chamber to establish a pressure differential across said screen, sensing said pressure differential, and regulating the flow rate of the oil from said chamber in response to the pressure differential to maintain a predetermined pressure differential less than the critical pressure differential $$\Delta P_o = p_w - p_o = K \frac{\sigma_{wo}}{r}$$

required to overcome said interfacial surface tension and drive water through said screen into said separator chamber were $p_w$ is the total water pressure outside of the screen, $p_o$ is the oil pressure just inside the screen, $\sigma_{wo}$ is the interfacial surface tension between water and oil, $r$ is the radius of the oil-water interface (i.e., the radius of the screen pores), and K is a constant of proportionality having a value depending on the type of screen.

5. The method of claim 4 wherein:
said stilling basin has a forwardly opening skimmer inlet to said stilling chamber at the level of said water surface and an outlet from said stilling chamber; and
said step of inducing surface water and oil flow into said stilling chamber involves propelling said stilling basin forwardly along the water surface.

6. The method of claim 4 wherein:
said stilling basin has a skimmer inlet to said stilling chamber at the level of said water surface and an outlet from said stilling chamber; and
said step of inducing surface water and oil flow through said stilling chamber involves pumping water from said stilling chamber through said outlet.

7. Apparatus for separating a selected liquid from a second liquid immiscible with said selected liquid, comprising:
a hollow liquid separator containing a chamber bounded by a screen and having means for filling said separator chamber with said selected liquid;
means for supporting said separator in the body of immiscible liquids in a position such that at least a portion of the outer surface of said screen contacts said body, whereby those screen pores which are externally exposed to said second liquid contain a liquid interface whose interfacial surface tension resists passage of said second liquid through the respective pores into said chamber, and those screen pores which are externally exposed to said selected liquid are devoid of a liquid interface resisting passage of said selected liquid through the respective pores into said chamber; and
means for inducing passage of said selected liquid only from said liquid body through said screen into said chamber including means for pumping said selected liquid from said chamber after filling of the chamber with said selected liquid to establish a pressure differential across said screen, means for sensing said pressure differential, and means for regulating the flow rate of said selected liquid from said separator chamber to maintain a predetermined pressure differential less than the critical pressure differential $$\Delta P_o = p_w - p_o = K \frac{\sigma_{wo}}{r}$$

necessary to overcome said interfacial surface tension and drive said second liquid through said screen into said chamber, where $p_w$ is the total liquid pressure outside of the screen, $p_o$ is the liquid pressure just inside the screen, $\sigma_{wo}$ is the interfacial surface tension between said liquids, $r$ is the radius of the liquid interface (i.e. the radius of the screen pores), and K is a constant of proportionality having a value depending on the type of screen.

8. Apparatus according to claim 7 wherein:
the density of said selected liquid is less than the density of said second liquid, whereby said selected liquid floats on the surface of said liquid body; and
said separator supporting means comprises float means for floating said separator on said body surface.

9. Apparatus according to claim 8 wherein:
said separator comprises a relatively flat housing having a normally lower open side across which said screen extends; and
said separator floats on said body surface with said screen facing downwardly.

10. Apparatus according to claim 8 wherein:
said separator comprises a rotary drum having a circumferential wall formed by said screen;
said apparatus further comprises means for rotating said drum.

11. Apparatus according to claim 10 wherein:
said drum screen wall is shaped to provide hollow radial vanes spaced circumferentially about the drum for transporting said selected liquid from said body surface to the underside of said drum and then about said drum as the latter rotates.

12. Apparatus according to claim 8 wherein:
said separator comprises a long flexible conduit having sidewalls formed by said screen;
said separator supporting means comprise float means along said conduit for floating said conduit at said body surface; and
said conduit is adapted to be placed in surrounding relation to a mass of said selected liquid floating on said body surface.

13. Apparatus for removing from the surface of a body of water a liquid immiscible with and floating at the surface on said water comprising:
float means adapted to float in said water;
a stilling basin supported by said float means so as to float at said water surface and containing a stilling chamber;
means for inducing flow of surface water and liquid from said body through said stilling chamber;
at least one hollow liquid separator within said stilling chamber containing a chamber bounded by a screen and having means for filling said separator chamber with said liquid;
means supporting said separator in said stilling basin with said screen in contact with the water and liquid in said stilling chamber, whereby those screen pores which are externally exposed to water in said stilling chamber contain a liquid interface whose interfacial surface tension resists passage of water through the respective pores into said separator chamber, and those screen pores which are externally exposed to said liquid in said stilling chamber are devoid of a liquid interface resisting passage of said liquid through said screen into said separator chamber; and
means for inducing passage of said liquid only from said stilling chamber through said screen into said separator chamber including means for pumping said liquid from said separator chamber after filling of said separator chamber with said liquid to produce a pressure differential across said screen, means for sensing said pressure differential, and means for regulating the flow rate of said liquid from said separator chamber to maintain a predetermined pressure differential less than the critical pressure differential $$\Delta P_o = p_w - p_o = K \frac{\sigma_{wo}}{r}$$

required to overcome said interfacial surface tension and drive said water through said screen into said separator chamber, where $p_w$ is the total water pressure outside of the screen, $p_o$ is the liquid pressure just inside the screen, $\sigma_{wo}$ is the interfacial surface tension between water and liquid, $r$ is the radius of the liquid-water interface (i.e. the radius of the screen pores), and K is a constant proportionality having a value depending on the type of screen.

14. Apparatus according to claim 13 wherein:
said surface water and liquid flow inducing means comprises a forwardly opening surface skimmer inlet to said stilling chamber at said normal water line level, an outlet from said stilling chamber, and means for propelling said apparatus forwardly along the water surface to cause flow of surface water and liquid through said inlet into said stilling chamber and flow of water from said stilling chamber through said outlet.

15. Apparatus according to claim 14 wherein:
said stilling chamber contains a number of said separators disposed side-by-side; and
said pumping means is connected to all of said separators for pumping said liquid from said separators to produce said predetermined pressure differential across the separator screens.

16. Apparatus according to claim 13 wherein:
said means for inducing flow of surface water and liquid through said stilling chamber includes pumping means.

17. Apparatus according to claim 13 wherein:
said stilling basin comprises a top plate, a bowl below and having a rim spaced from said plate so as to define said stilling chamber between said plate and bowl and an annular surface skimmer inlet to said stilling chamber between said rim and plate, and an outlet at the bottom of said bowl communicating with said stilling chamber and containing said pumping means for pumping water from said stilling chamber through said outlet; and
said screen is attached to the underside of said top plate in spaced relation thereto, whereby said top plate and screen constitute said separator.

18. Apparatus according to claim 13 wherein:
said stilling chamber contains a number of said separators;
each separator comprises a flat hollow rectangular housing having a normally open side across which extends the separator screen;
said separators are arranged in rows extending lengthwise and crosswise of said stilling chamber so as to form a separator array encompassing virtually the entire water surface area within said stilling chamber;
said pumping means are connected to all of said separators for pumping said liquid from said separators to produce said predetermined pressure differential across each separator screen; and
said separator supporting means comprise float means on said separators for floating the separators on the water surface in said stilling chamber with the separator screens facing downwardly.

19. Apparatus according to claim 18 including:
hinge connections between the adjacent separators, whereby said separators may rise, fall, and rotate relative to one another under the action of wave motion in said stilling chamber.

20. Apparatus according to claim 13 wherein:
said separator comprises a rotary drum supported in said stilling chamber for rotation on an axis approximately at the normal water line level in said stilling chamber;
said screen forms the circumferential wall of said drum; and
means for driving said drum in rotation.

21. Apparatus according to claim 20 wherein:
said circumferential screen wall is shaped to define a number of hollow radial vanes spaced circumferentially about said drum.

22. Apparatus according to claim 13 wherein:
said liquid is oil; and
said apparatus comprises an oil recovery apparatus for removing said oil from the water surface.

References Cited
UNITED STATES PATENTS

| | | | |
|---|---|---|---|
| 2,470,418 | 5/1949 | Verner | 210—Dig. 21 |
| 2,758,720 | 8/1956 | Van Dijck | 210—23 X |
| 2,788,125 | 4/1957 | Webb | 210—23 X |
| 3,358,838 | 12/1967 | Kosar et al. | 210—242 X |
| 2,960,462 | 11/1960 | Lee et al. | 210—23 X |
| 3,578,171 | 5/1971 | Usher | 210—242 |
| 2,778,500 | 1/1957 | Fuller | 210—242 X |

SAMIH N. ZAHARNA, Primary Examiner

U.S. Cl. X.R.

210—137, 242 Dig. 21